April 21, 1959 V. J. BRANDT 2,883,080
RELEASABLE LIFT ATTACHMENT FOR TRACTORS
Filed Jan. 30, 1956 4 Sheets-Sheet 1

VERNON J. BRANDT
INVENTOR
HUEBNER, BEEHLER,
WORREL & HERZIG
ATTORNEYS
BY
Richard M. Worrel

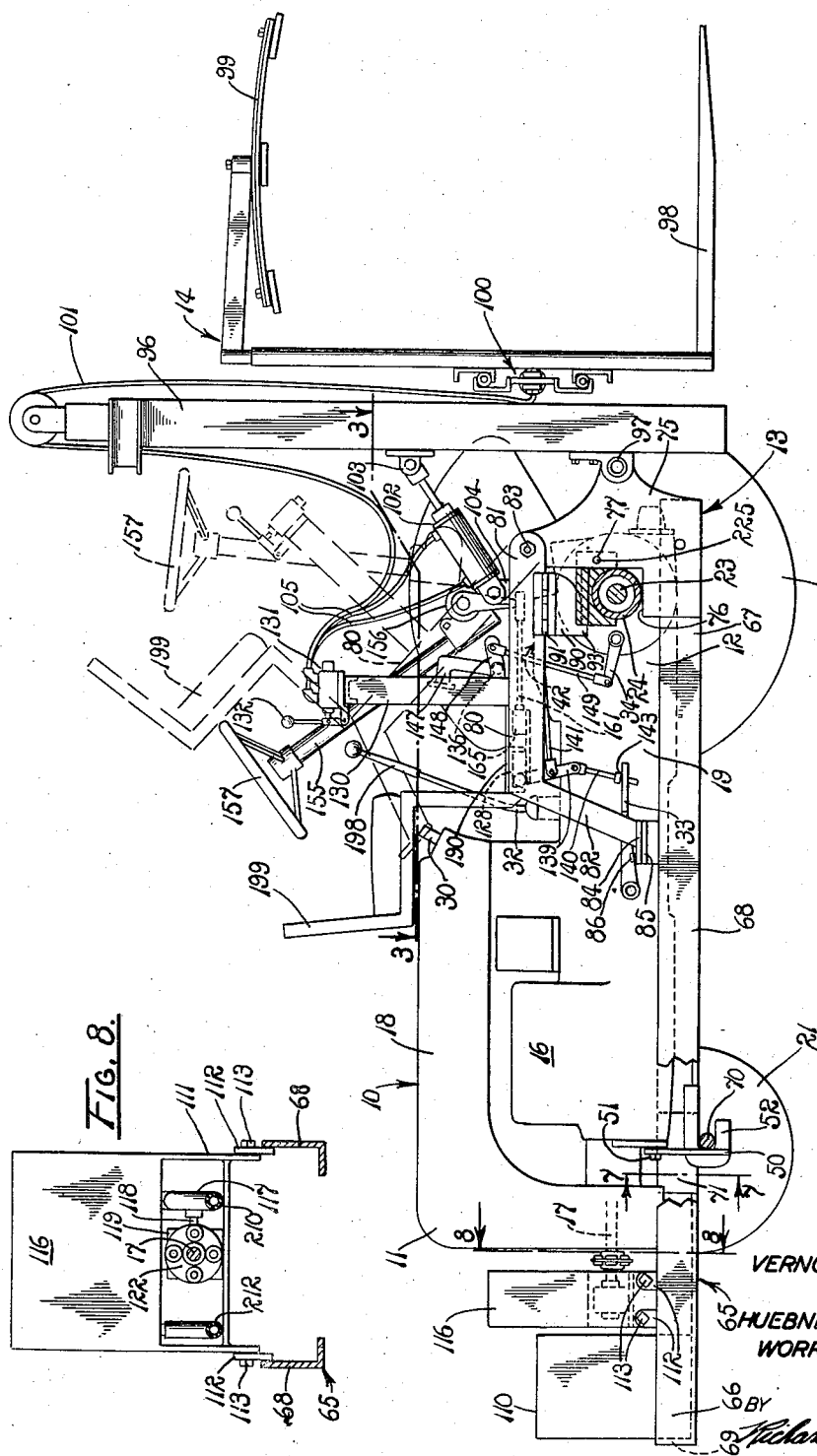

April 21, 1959  V. J. BRANDT  2,883,080
RELEASABLE LIFT ATTACHMENT FOR TRACTORS
Filed Jan. 30, 1956  4 Sheets-Sheet 3

VERNON J. BRANDT
INVENTOR
HUEBNER, BEEHLER,
WORREL & HERZIG
ATTORNEYS

April 21, 1959  V. J. BRANDT  2,883,080
RELEASABLE LIFT ATTACHMENT FOR TRACTORS
Filed Jan. 30, 1956  4 Sheets-Sheet 4
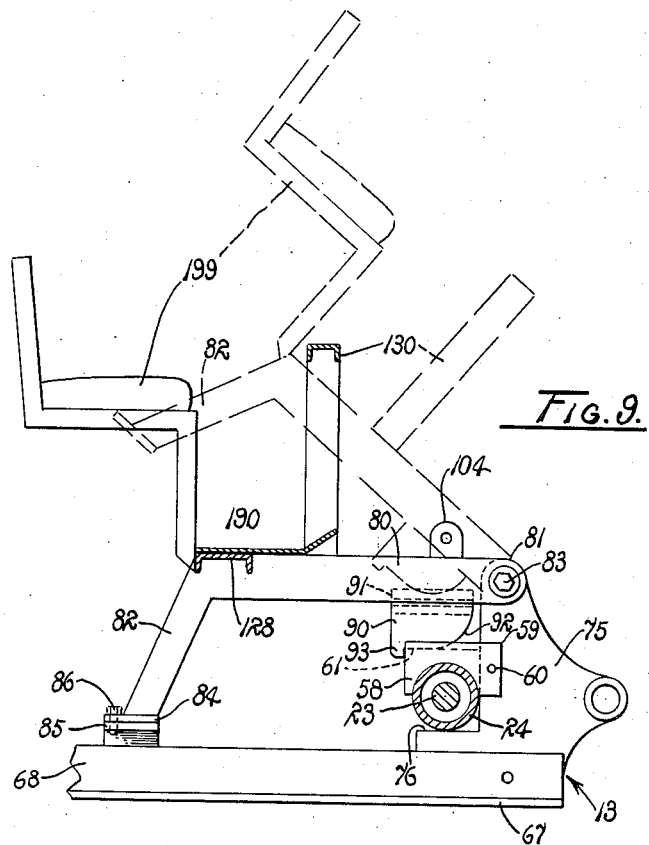
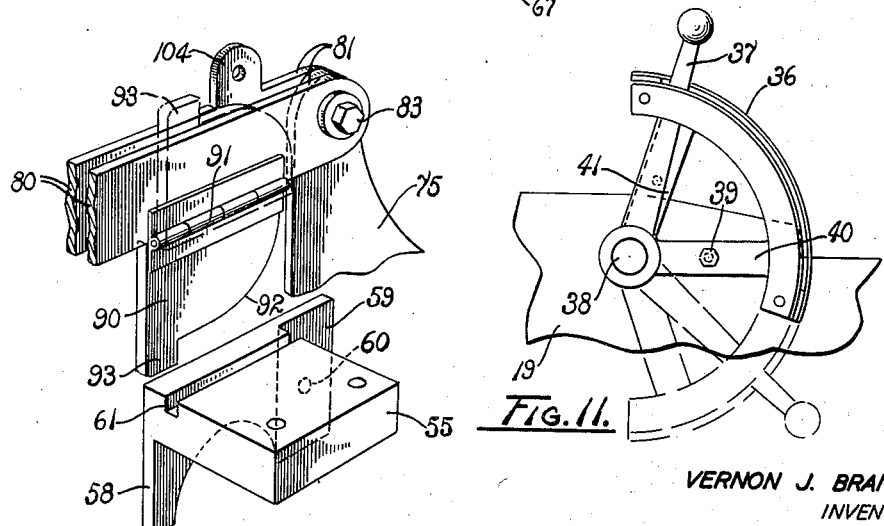
VERNON J. BRANDT
INVENTOR
HUEBNER, BEEHLER,
WORREL & HERZIG
ATTORNEYS

United States Patent Office 2,883,080
Patented Apr. 21, 1959

2,883,080

RELEASABLE LIFT ATTACHMENT FOR TRACTORS

Vernon J. Brandt, Reedley, Calif.

Application January 30, 1956, Serial No. 562,056

22 Claims. (Cl. 214—674)

The present invention relates to a device for mounting a work tool on a vehicle which is adapted to sustain forces imposed on the tool in a variety of directions and which enables convenient control of both the tool and the vehicle from a common operator's station.

It has long been known to provide tractors with hitching arrangements, such as tool bars, hydraulic lift arms, and the like, for enabling attachment of earthworking tools to the tractors. The primary force imposed on such a hitch during use of attached tools are drag forces exerted generally rearwardly on the tractor through the hitch or coupling structure. The hitches of the prior art have generally been adequate to withstand such forces but such hitches have been found unsatisfactory for supporting certain types of work tools where the forces or loads to be imposed on the hitches, as a result of operation of such tools, are complex and include other than drag forces.

For example, in modern farm operations, produce is often placed in boxes in the field and the boxes loaded on pallets for bulk transportation to packing houses, warehouses, and the like. Conventional lift trucks have generally been impractical for carrying the pallets in the field because their usual small wheel sizes are designed for hard surfaces rather than tilled fields. On the other hand, tractors are generally suited for travel in soft earth as well as on hard ground. There was thus found a need for mounting such tools as lifting apparatus on such vehicles as tractors.

The mounting of such tools as a lifting apparatus on a tractor involves additional problems to those normally encountered in hitch structures. Most tools which are mounted to trail behind a tractor perform their functions successfully with only brief periodic over-the-shoulder observations by the driver of the tractor as it travels forwardly. A lifting apparatus, and certain other tools, however, ordinarily require more direct attention of an operator and when mounted on the rear of a tractor are not conveniently controlled with the operator facing forwardly of the tractor in the usual manner.

Further, such tools may be extremely heavy and cumbersome to handle thus necessitating a device for mounting the tools in a convenient and easy manner. Where the work tools are hydraulically controlled, another problem is that of connecting and disconnecting hydraulic lines thereby permitting undesirable entry of air into the systems involved. The subject invention is designed to provide solutions to these and other problems.

It will be understood as the description proceeds, however, that the present invention is not limited to the mounting of lifting apparatus on a tractor but has more general application to the mounting of a variety of work tools on vehicles where problems similar to those discussed are involved.

Accordingly, it is an object of this invention to provide an arrangement for releasably mounting a tool on a vehicle in an extremely simple manner and with a minimum number of fastening members.

Another object is to enable connection and disconnection of relatively heavy work tools to and from vehicles by only a single workman in an easy manner and in a minimum of time.

Another object is to provide a device for mounting a work tool on a vehicle which is adapted to withstand heavy weights and other forces imposed in a variety of directions thereon.

Another object is to provide a device for mounting a tool on a vehicle which enables operation of both the tool and the vehicle at a common operator's station.

Another object is to enable the mounting and operation of a fork lift on a tractor or other vehicle which is suited for use in relatively soft ground.

Another object is to provide an attachment for mounting an hydraulically actuated tool on a vehicle which may be releasably connected to the vehicle without the connection or disconnection of any hydraulic lines thereby precluding undesirable entry of air into the hydraulic system therefor.

Another object is to provide a mounting device of the nature described which is simple and economical to construct, durable, dependable in operation, adapted for speedy connection and disconnection to tools and vehicles, adapted for use with a variety of tools and vehicles, and which is highly effective in accomplishing its intended purposes.

These and other objects will become more fully apparent upon reference to the following description.

In the drawings:

Fig. 2 is a side elevation of the tractor, lift apparatus, and mounting device of Fig. 1 showing a portion of the mounting device in dashed lines in a position released from connection to the tractor.

Fig. 8 is somewhat enlarged vertical section taken on line 8—8 of Fig. 2.

Fig. 9 is a somewhat enlarged fragmentary side elevation of another portion of the mounting device of the present invention shown in an attached position by full lines and in a released position by dashed lines.

Fig. 10 is a somewhat enlarged fragmentary perspective of an automatic locking arrangement used in the present invention.

Fig. 11 is a somewhat enlarged fragmentary view of an hydraulic control found on the tractor of Fig. 1 which may be moved between an upper position shown in full lines and a lower position shown in dashed lines in a manner subsequently described.

Figure 1:
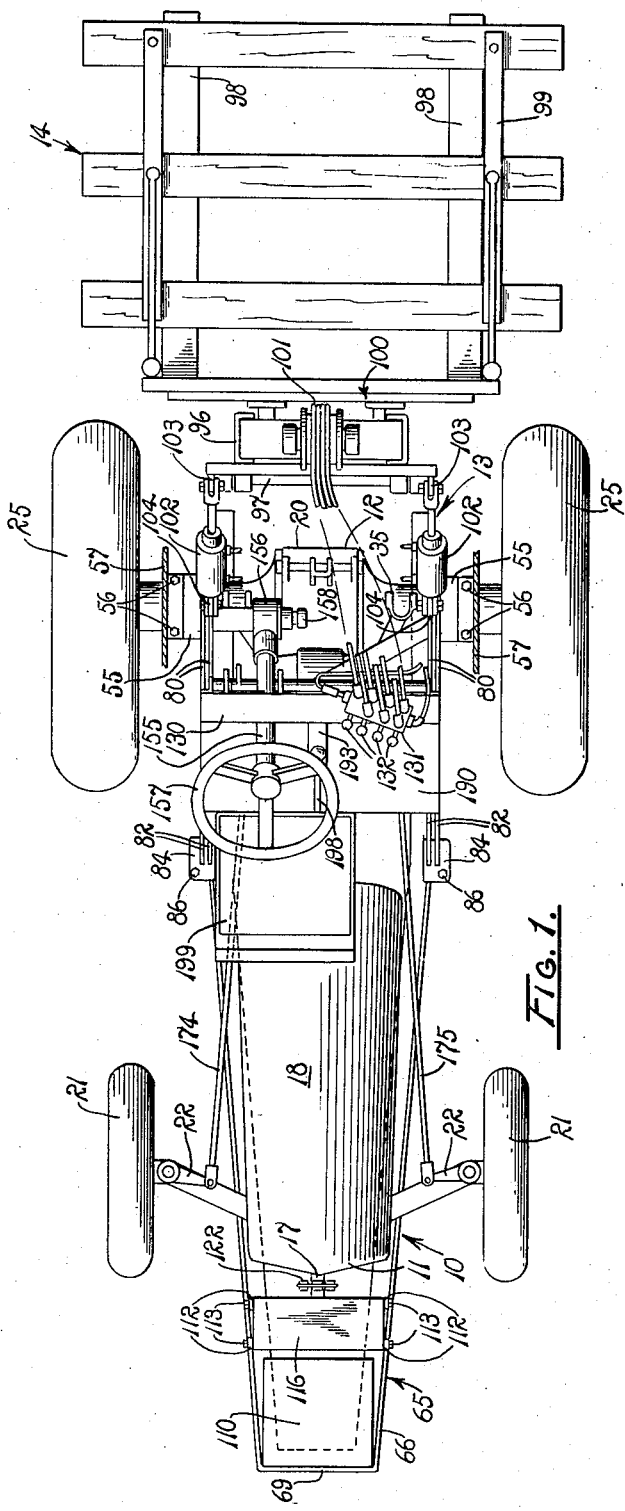
Fig. 1 is a top plan view of a tractor and a lift apparatus showing the mounting device of the present invention supporting the apparatus on the tractor.

Referring more particularly to the drawings, a tractor 10 having forward and rearward end portions 11 and 12 is shown in Figs. 1 and 2 with the mounting device, generally indicated at 13, of the present invention supporting a fork lift 14 on the tractor.

The tractor 10, as best seen in Fig. 2, is of a well known form but for descriptive convenience several of its parts requiring later reference are preliminarily identified. The tractor employs an engine 16 having a forwardly extended crank shaft 17, an engine hood 18, a transmission and hydraulic mechanism housing 19, and a differential housing 20. The tractor is supported for earth traversing movement on front wheels 21 having inwardly extended steering levers 22, and a rear axle 23, enclosed by a rear axle housing 24. The rear axle and the rear of the tractor are supported on rear wheels 25. It is significant that the rear wheels are much larger than the front wheels and thus are able to support much greater weights for earth traversing movement even in soft soils. The tractor 10 also has a main steering shaft 30, a carburetor control rod 31, as seen Fig. 4, a gear shift 32, a main clutch pedal 33, left and right brake control levers 34, and hydraulically controlled lift arms 35. A quadrant 36 guides a control handle 37 which controls lowering and raising of the lift arms. It is to be noted that for purposes of the present invention, the quadrant is pivotally mounted on a pin 38 for movement between an upper position, shown in full lines in Fig. 11, and wherein it is held by means of a bolt 39 extended through a radius arm 40 of the quadrant, and a lower position, shown in dashed lines in Fig. 11, wherein it is held by the bolt extended through an upper radius arm 41. Although not shown, it is pointed out that a seat bracket for a seat is ordinarily mounted on the tractor on the housings 19 and 20 at a position generally indicated at 42.

Figure 7:
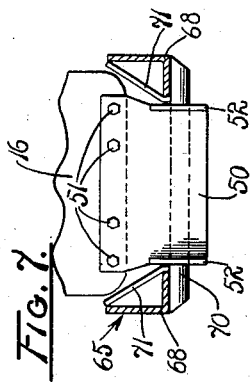
Fig. 7 is a somewhat enlarged fragmentary vertical section taken on line 7—7 of Fig. 2.

Referring in particular to Figs. 2 and 7, a mounting plate 50 is dependently secured by bolts 51 at the forward end of the engine 16 in a downwardly extended position. A pair of reclined rearwardly facing U-shaped hooks 52 are secured on opposite sides of the plate.

Figure 5:
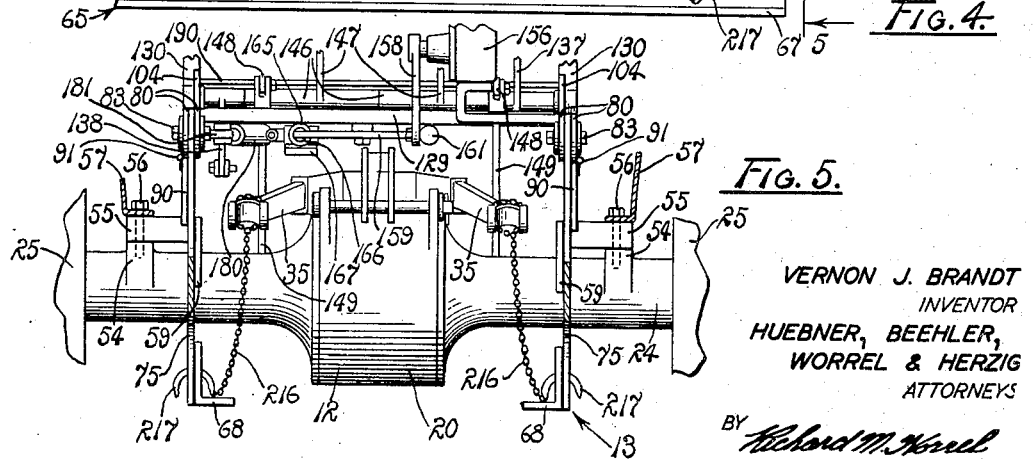
Fig. 5 is a fragmentary vertical transverse section taken on line 5—5 of Fig. 4.

With reference to Fig. 5, the rear axle housing 24 is seen to have upwardly extended bosses 54. Support blocks 55 are rested on and secured to the bosses by means of bolts 56 screw-threaded into the bosses. Fenders 57 are secured to the support blocks by the bolts for extension over the rear wheels 35. The blocks have downwardly extended flanges 58 fitted to the axle housing and provide rearwardly extended portions 59 having holes 60 therein. The blocks have upwardly disposed elongated slots or grooves 61, constituting detent sockets, longitudinally aligned with the tractor 10.

Figure 6:
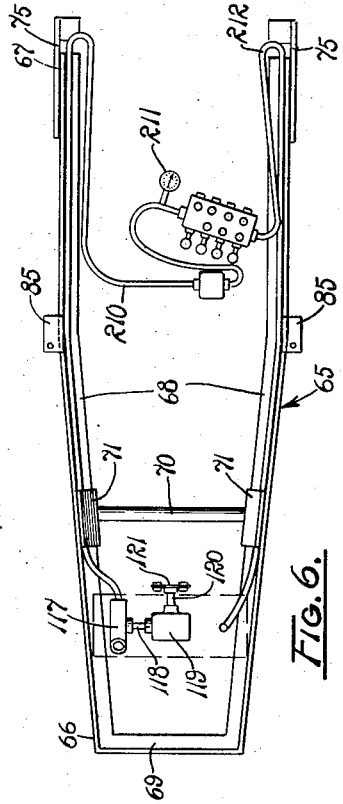
Fig. 6 is a somewhat enlarged top plan view of a portion of the mounting device of the present invention and also showing part of an hydraulic system used with the invention.

With reference to Fig. 6, the mounting device 13 includes an elongated frame 65 having forward and rearward portions 66 and 67, longitudinal frame members 68, and a forward transverse member 69. A transverse rod 70 interconnects the longitudinal frame members forwardly of the frame, and a pair of outwardly upwardly inclined guide members 71 are secured at opposite ends of the rod and to the longitudinal frame members. As seen if Figs. 2 and 4, endwardly disposed mounting brackets 75 are upwardly extended from the rearward ends of the longitudinal frame members 68 and provide lower abutment edges 76 engageable with the axle housing 24 and apertures 77 rearwardly adjacent to the axle housing when the frame 65 is in operable position.

The mounting device 13 further includes spaced pairs of support arms 80, seen in Figs. 2, 3, 4, 5 and 9, having rearward ends 81 and downwardly and forwardly angulated forward ends 82. The rearward ends of the support arms are pivotally connected by pins 83 to the upwardly extended mounting brackets 75 for elevational pivot movement of the arms around substantially horizontal axes between upper retracted positions and lower positions with the rearward ends substantially parallel to the frame 65 and the forward ends adjacent to the frame. Arm plates 84 are provided on the forward ends of the support arms, and frame plates 85 are provided on the longitudinal frame members 68 so as to be disposed against the arm plates when the arms are in lower positions. Bolts 86 are provided for extension through the arm and frame plates releasably to secure the arms to the frame in their lower positions. The bolts are conveniently rotatably received in the plates 84 and screw-threadably engaged in the plates 85.

As shown in Fig. 10, detent flaps 90 are pivotally connected by means of hinges 91 to the support arms 80 adjacent to the rearward ends 81 thereof for pivotal movement around longitudinal axes between retracted positions against their respective arms and positions downwardly extended from the arms when the arms are in their lower positions. The detent flaps have lower arcuate camming edges 92 and extended thrust bearing fingers 93. Although the flaps are only shown on the outer support arm of each pair of arms, it is to be understood that flaps can be also connected to the inner arms of each pair, if desired.

The lifting apparatus 14 provides an elevator frame 96 pivotally supported on the mounting bracket 75 at a lower end by a pivot rod 97. The apparatus has upper and lower clamps 98 and 99, and hydraulic clamp control rams, generally indicated at 100, having conduits 101 provided for controlling the clamps. A pair of tilt rams 102 are pivotally interconnected between ears 103 on the elevator frame and ears 104 on the support arms 80. Conduits 105 are connected to the tilt rams for delivery and return of fluid.

With reference to Fig. 2, a weight 110 is supported on the forward end portion 66 of the frame 65. A support bracket 111 is connected to the frame rearwardly of the weight by means of forward and rearward ears 112 and forward and rearward bolts 113 interconnecting the ears and the bracket. In this manner the bracket may be pivoted around the forward bolt, after removing the rearward bolt, between a reclined position on the frame and an upstanding position, as shown in the drawings. Of course, the weight must be removed in order to lower the bracket.

An hydraulic power unit is mounted on the support bracket 111 and includes a reservoir 116, a pump 117 having an inlet connected to the reservoir and a drive shaft 118. A transmission 119 is connected to the drive shaft for the pump and also provides a coupling shaft 120. A driven coupling 121 is secured to the coupling shaft. Further, a drive coupling 122 is secured to the crank shaft 17 of the tractor 10 and is adapted for releasable connection to the driven coupling.

Figure 3:
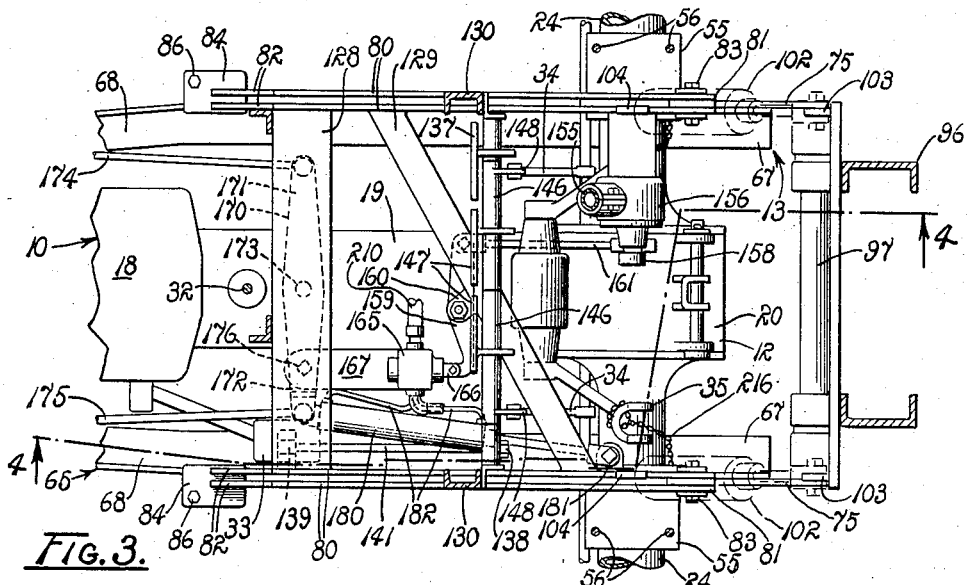
Fig. 3 is a somewhat enlarged fragmentary horizontal section taken on line 3—3 of Fig. 2.

Referring to Fig. 3, a transverse strut 128 is extended between the support arms 80, a diagonal strut 129 is extended between the arms rearwardly of the transverse strut, and a stand 130 is mounted on the arms in upwardly arched position, the latter being best seen in Figs. 1 and 2. A work tool control valve unit 131 is mounted on the stand, is connected to the conduits 101 and 105 for the clamp control rams 100 and tilt control rams 102, and provides individual operating handles 132 for controlling the rams.

Figure 4:
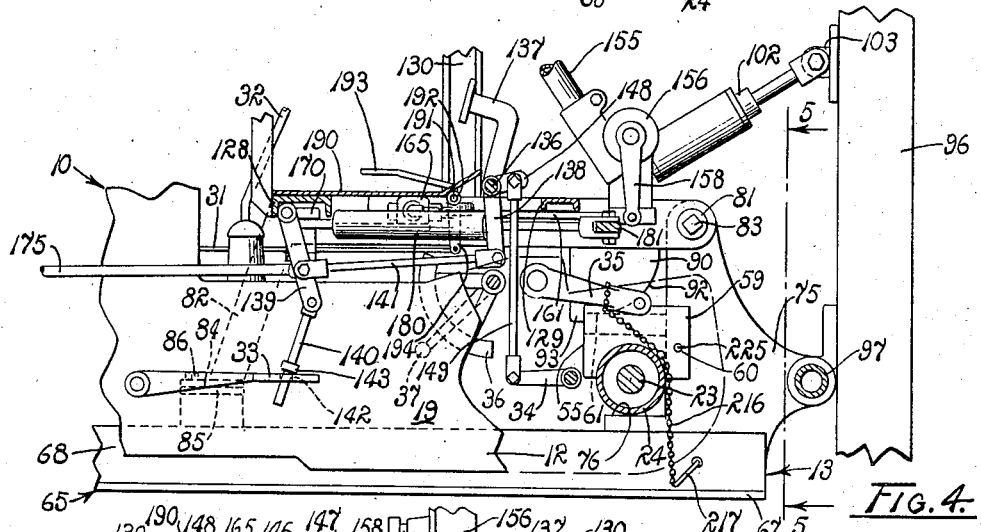
Fig. 4 is a fragmentary vertical longitudinal section taken on line 4—4 of Fig. 3.

An elongated shaft 136 is extended between the support arms 80 adjacent to the lower ends of the stand 130, as seen in Figs. 3 to 5. An auxiliary clutch pedal 137 is upwardly extended from the shaft and rigidly connected thereto. A clutch lever 138 is downwardly extended from the shaft and likewise is in rigid connection therewith. An upper toggle link 139 provides an upper end pivotally connected to the forward transverse strut 128, and a lower toggle link 140 provides an upper end pivotally connected to a lower end of the upper toggle link. A clutch linkage 141 is pivotally connected at one end to the clutch lever and at the opposite end to the upper toggle link between its upper and lower ends. The main clutch pedal 33 on the tractor 10 has an opening 142 therein adapted to receive the lower toggle link when the mounting device 13 is properly positioned on the tractor. The lower toggle link has a stop 143 adapted to abut the clutch lever when the link is positioned in the opening 142.

Sleeves 146 are journalled in end to end relation on the shaft 136, and adjacent auxiliary brake pedals 147 are rigidly connected to the sleeves and upwardly extended therefrom. Brake control members 148 are extended outwardly from the sleeves, and elongated rods 149 provide upper ends pivotally connected to the members 148 and lower ends adapted for pivotal connection to the brake levers 34 for both the left and right rear wheels 25.

An auxiliary steering shaft 155 is forwardly upwardly extended from a gear box 156 connected to one of the support arms 80 and an auxiliary steering wheel 156 is connected to the steering shaft. A pendant lever 158 is downwardly extended from the gear box and is adapted for pivotal movement in response to rotation of the steering shaft. As seen in Fig. 3, an elongated rear beam 159 provides opposite ends and is pivotally connected intermediate such ends on an ear 160 secured to the diagonal strut 129. An elongated steering linkage 161 pivotally interconnects the pendant lever 158 and an end of the rear beam.

A steering valve 165 is pivotally connected to the opposite end of the rear beam 159 from the end connected to the link 161 by means of a flange 166. A plate 167 is forwardly extended from the valve. A front beam 170 provides opposite ends 171 and 172 and is pivoted at 173 intermediate the ends of the transverse strut 128. A right steering rod 174 and a left steering rod 175 are pivotally interconnected between the right and left ends of the front beam and the right and left steering levers 22 of the front wheels 21. The valve plate 167 is pivotally connected at 176 to the front beam adjacent to the left end 172 thereof. An hydraulic ram 180 provides a rear end pivotally connected to one of the support arms 80 by an ear 181 and a forward end pivotally connected to the left end 172 of the front beam 170. Conduits 182 interconnect the ram and the steering valve 165.

A floor board 190 is shown in Fig. 4 rested on the struts 128 and 129 forwardly of the mounting shaft 136. A pintle 191 on the floor board journals a tube 192 rotatably thereon and an auxiliary accelerator pedal 193 is rigidly upwardly extended from the tube. A lever 194 is connected to the tube and is downwardly extended therefrom for connection to the carburetor control rod 31.

A tubular gear shift extension 198 is fitted over the gear shift 32 of the tractor 10. An auxiliary seat 199 is rigidly connected to the transverse strut 128 and upwardly extended therefrom forwardly of the auxiliary steering wheel 157, mounting shaft 136, and stand 130, and is adjacent to the gear shift extension.

Referring to Fig. 6, a delivery conduit 210 is connected from the output of the pump 117 in series with the steering control valve 165 and the work tool control valve unit 131. A pressure gauge 211 is provided in the delivery conduit, and a return conduit 212 interconnects the valve unit 131 and the reservoir 116.

Chains 216 provide upper ends connected to the lift arms 35 of the tractor and lower ends having hooks 217 adapted for releasable connection to the rearward end portion 67 of the frame 65.

*Operation*

The operation of the described embodiment of the present invention is believed to be readily apparent and is briefly summarized at this point. In so doing it will be assumed that the tractor 10 is separated from the mounting device 13 and lifting apparatus 14. Thus, the following description will briefly review the manner in which the mounting device is attached to the tractor.

Initially, the mounting device 13 is prepared for tractor attachment by removing the weight 110, removing the rear bolt 113, and pivoting the support bracket 111 including the hydraulic power unit downwardly against the forward end portion of the frame 65. It is assumed that the rams 102 are in retracted condition holding the support arms 80 in elevated position, as shown in dashed lines in Figs. 1 and 9.

With the frame 65 on the ground or other convenient support surface, the tractor 10 is backed up over the frame with the front and rear wheels 21 and 25 straddling the frame. The tractor is stopped with the hooks 52 just forwardly of the transverse rod 70 and with the rear axle housing 24 generally over the abutment edges 76. The tractor 10 is then prepared for attaching the mounting device 13. The seat bracket and the seat, neither of which are shown, are removed. Also, the steering wheel, not shown, and the brake pedals, not shown, are removed leaving the main steering shaft 30 and the brake levers 34.

The chains 216 are then connected between the lift arms 35 and the rearward end portion 66 of the frame 65. By manipulation of the control handle 37, the arms are elevated in the usual manner. This raises the front end portion 66 of the frame initially inasmuch as it is the lighter end of the frame. In so doing, the guide members 71 abut the hooks 52 and tend to center the frame beneath the tractor. As the lift arms continue to rise, the rearward end portion of the frame is brought up so that the edges 76 abut the rear axle housing 24. This also slides the forward end of the frame forward to insert the rod 70 snugly into the hooks 52. Also, at this point the holes 60 and apertures 77 in the flanges 58 and brackets 75 are brought into registration.

In order to lower the support arms 80, it is necessary to lower the quadrant 36 and the control handle 37. However, when this is done, the lift arms 35 automatically descend. Thus, to hold the frame 65 temporarily in substantially horizontal position beneath the tractor, pins 225 are releasably slidably inserted through the apertures 77 and holes 60. The quadrant and handle are then lowered by removing the bolt 39 in the manner previously described. It is to be understood that in certain tractors this quadrant and control handle may not be in a position to interfere with the support arms or the floor board 190. In addition, in some tractors it may be possible and desirable to accommodate the quadrant and control handle in some other manner as by providing an opening in the floor board.

The detent flaps 90 are then pivoted downwardly and the tilt control rams 102 extended to lower the arms 80. The detent flaps are located to be received in the detent sockets 61 of the support blocks 55 when the support arms are in their lower positions. As the support arms descend, the camming edges 92 engage the slots and draw the frame upwardly to bring the abutment edges 76 snugly against the axle housing 24. The thrust fingers 93 extend downwardly forwardly of the support blocks when the arms are completely lowered, and the arm and frame plates 84 and 85 are brought into engagement. Bolts 86 are then extended through the arm and frame plates thereby to lock the support arms to the frame and to secure the mounting device on the tractor. If desired, the pins 225 may then be removed. When the arms 80 descend, the camming edges 92 insure that the edges 76 are drawn into snug engagement with the axle housings 24 and that the frame is properly supported. When the flaps 90 are received in the channels 61, they are automatically precluded from folding and thus provide dependable support for the frame. When the arms 80 are fully lowered, the fingers 93 engage the forward edges of the blocks 55 and preclude shifting of the frame rearwardly of the tractor. The brackets 75 preclude forward shifting of the frame. The flaps are regarded as detents and the slots as detent receptacles. Together they provide releasable latch means for supporting the frame on the tractor.

The support bracket 111 is then pivoted into its upper position, the rear bolt 113 connected, and the couplings 121 and 122 interconnected. The weight 110 is next repositioned on the forward end portion of the frame 65.

The auxiliary controls for the tractor 10 are then connected. Thus, the left and right steering rods 175 and 174 are connected to the opposite ends 172 and 171 of the front beam 170. The accelerator lever 194 is connected to the carburetor control rod 131. The gear shift extension 198 is put in place. The lower toggle link 140 is inserted in the opening 142 of the main clutch pedal 33, and the brake control rods 149 are connected to the brake levers 34.

With all these connections made, the mounting device 13 is properly attached to the tractor 10 and thereby supports the lifting apparatus 14 on the tractor for movement as desired. It is significant that the entire device may be connected or disconnected from the tractor by only a single workman even though the mounting device and lift apparatus may be of substantial weight. Further, the entire operation may be performed in a matter of a few minutes. To operate the lifting apparatus, a driver sits in the auxiliary seat 199 in which position he is conveniently located to operate any of the various controls for both the lifting apparatus 14 and the tractor 10 as will be evident.

From the foregoing, it will be understood that a highly simplified device has been provided for mounting and demounting a work tool on a vehicle. The mounting device is adapted to withstand stresses imposed on the work tool as a result of the loads handled and their manipulation. Further, the device enables convenient operation of both the tool and the vehicle at a common station auxiliary to the normal vehicle operating station. Inasmuch as the mounting device incorporates an hydraulic system connected to the tool, no hydraulic connections are necessary once the device is in place on a vehicle. Of course, the device may be used to mount tools which are not hydraulically controlled. In practice, the device has offered an excellent means for operating a lifting apparatus in soft ground by supporting such apparatus on a tractor.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire ot secure by Letters Patent is:

1. A device for mounting a work tool on a vehicle having forward and rearward ends and a rear axle housing comprising an elongated frame adapted to be disposed in a longitudinal substantially horizontal position beneath the vehicle having a rearward end portion and a forward end portion, means on the forward end portion of the frame adapted for releasable connection to the forward end of a vehicle, the frame having a mounting bracket on the rearward end portion thereof adapted to extend upwardly behind the rear axle housing of a vehicle, support blocks adapted to be connected to the rear axle housing of a vehicle having upwardly disposed detent sockets therein, elongated arms adapted to extend upwardly from the mounting brackets of the rear axle housing of a vehicle having forward ends and rearward ends, means pivotally connecting the rearward ends of the arms to the mounting brackets for elevational pivotal movement around substantially horizontal axes between upper and lower positions, detents secured to the arms releasably received in the detent sockets in the lower positions of the arms, and means releasably interconnecting the forward ends of the arms and the frame forwardly of their pivotal connection to the mounting brackets in the lower positions of the arms.

2. A device for mounting a work tool on a vehicle having forward and rearward ends and a rear axle housing comprising an elongated frame having forward and rearward end portions and being adapted to be longitudinally extended in a substantially horizontal position beneath such a vehicle with the rearward end portion of the frame below the axle housing, the frame having mounting brackets upwardly extended rearwardly against the axle housing, coupling means on the frame adapted to couple the forward end of the frame to the vehicle, support blocks borne by the axle housing having upwardly disposed slots therein extended longitudinally of the tractor, elongated arms having forward ends and rearward ends pivotally connected to the mounting brackets for elevational pivotal movement around substantially horizontal axes between lower positions forwardly extended above the axle housing and upper positions, latching members secured to the arms downwardly extended in the lower positions of the arms for reception in the slots of the support blocks to support the arms on the axle housing, and means releasably interconnecting the forward ends of the arms and the frame forwardly of the axle housing in the lower positions of the arms.

3. In combination with a vehicle having forward and rearward ends and a drive mechanism including a forwardly extended crankshaft and a rear axle housing, an attachment for releasably supporting a work tool on the vehicle, said tool having hydraulically actuated means, comprising an elongated frame releasably supported underneath the rear axle housing of the vehicle having opposite ends forwardly and rearwardly extended longitudinally of the vehicle, means for mounting a work tool on the rearwardly extended end of the frame, support members pivotally connected to the rearwardly extended end of the frame for movement between lower positions over the rear axle housing and upper retracted positions, latch means on the support members and the rear axle housing releasably engageable in the lower positions of the support members, means releasably connecting the support members to the frame in their lower positions, an hydraulic system including a pump mounted on the forward end of the frame having driven connection to the crankshaft of the vehicle and hydraulic control means mounted on the support members hydraulically connected to the hydraulically actuated means of the tool, auxiliary vehicle operating controls mounted on the support members, and linkage means releasably interconnecting the auxiliary operating controls and the vehicle drive mechanism.

4. In combination with a vehicle having forward and rearward ends, a rear axle housing, rearwardly disposed hooks downwardly extended from the vehicle, and a drive mechanism including a forwardly extended rotatable drive shaft; a mounting device for supporting a work tool on the vehicle having hydraulically actuated work means comprising an elongated frame having a transverse rod releasably received in the hooks for supporting the frame in substantially horizontal position beneath the vehicle, an end forwardly extended from the vehicle, and an end rearwardly extended from the vehicle beneath the rear axle housing; an hydraulic pump mounted on the forwardly extended end of the frame having a driven shaft; means releasably coupling the drive shaft of the vehicle to the driven shaft of the pump for energizing the pump; end members connected to the frame and upwardly extended rearwardly of the rear axle housing; elongated support means pivotally connected to the end members for vertical pivotal movement between a downwardly extended position and an upwardly retracted position; vehicle operating controls mounted on the support means releasably connected to the drive mechanism of the vehicle in the lower position of the support means and releasable to permit elevation of the support means; an hydraulic valve mounted on the support means hydraulically connected to the hydraulically actuated means of the work tool; means releasably connecting the support means to the frame in said lower position; means releasably interlocking the support means and the axle housing in said lower position to preclude transverse and rearward longitudinal movement of the frame relative to the vehicle; and fluid conducting means mounted on the frame connecting the pump and the valve in hydraulic series circuit to the hydraulically actuated means of the work tool to enable operation of the work tool by said pump.

5. A releasable attachment for supporting an hydraulic lift apparatus on a tractor having forward and rearward ends, a forwardly extended crankshaft, and a rear axle housing comprising rearwardly open hooks adapted to be rigidly mounted beneath the forward end of a tractor, support blocks adapted to be rigidly mounted on the axle housing of a tractor having upwardly disposed slots adapted to be aligned longitudinally of the tractor on which the blocks are mounted, an elongated frame having forward and rearward end portions and being adapted to be longitudinally extended beneath a tractor with the forward and rearward end portions endwardly extended forwardly and rearwardly of the tractor, respectively, a transverse rod on the frame adapted to be releasably received on the hooks, the frame having end plates rigidly upwardly extended from the rearward end portion of the frame adapted to be positioned rearwardly against the rear axle housing of a tractor, means for mounting an hydraulic lift apparatus on the end plates, offset support arms having forward and rearward ends, means pivotally connecting the rearward ends of the arms to the end plates for elevational pivotal movement between upper positions and lower positions wherein they are adapted to extend over the axle housing of a tractor under which the frame is extended, detent flaps longitudinally hinged to the arms having outer arcuate camming edges and extended finger portions and being movable between pendent positions for camming reception of the edges in the slots of the support blocks in the lower positions of the arms with the finger portions downwardly extended forwardly of the blocks and retracted positions against their respective arms, bolts releasably interconnecting the forward ends of the arms and the frame in the lower positions of the arms, an hydraulic system including a pump supported on the forward end portion of the frame and an hydraulic valve adapted for connection to a lift apparatus on the end plates borne by the support arms, and drive means connected to the pump adapted to be releasably coupled in driven relation to the crankshaft of a tractor.

6. In combination with a tractor having forward and rearward end portions, a power lift, and a rear axle housing; a fork lift attachment comprising an elongated frame adapted to be received beneath the tractor in longitudinal alignment therewith, a pair of hooks having rearwardly disposed openings rigidly mounted beneath the forward end portion of the tractor in alignment transversely thereof, a shaft mounted transversely on the frame having opposite ends slidably receivable in the hooks, a pair of brackets rigidly mounted on the frame adapted for engagement with the rearward side of the rear axle housing, a pair of arms mounted on the brackets and forwardly extended therefrom on opposite sides of the tractor over the rear axle housing for pivotal movement between an upwardly retracted position and a downwardly pivoted position, means releasably interconnecting the frame and the arms in downwardly pivoted position, means mounted on the arms supporting the rearward end of the frame on the rear axle housing when the arms are in downwardly pivoted position, a fork lift mounted on the rearward end of the frame, and means releasably interconnecting the rearward end portion of the frame and the power lift of the tractor, the frame and elements borne thereby having a combined center of gravity rearwardly of the connection of said last named means to the frame whereby actuation of the lift means raises the forward end portion of the frame to bring the shaft into rearward alignment with the hooks and continued actuation raises the rearward end portion of the frame and slides the shaft forwardly into the hooks.

7. In combination with a tractor having forward and rearward end portions, a power take-off shaft, a power lift, and a rear axle housing; a self-contained hydraulic fork lift attachment comprising an elongated frame adapted to be received beneath the tractor in longitudinal alignment therewith, a pair of hooks having rearwardly disposed openings rigidly mounted beneath the forward end portion of the tractor in alignment transversely thereof, a shaft mounted transversely on the frame having opposite ends slidably receivable in the hooks, a pair of brackets rigidly mounted on the frame adapted for engagement with the rearward side of the rear axle housing, a pair of arms mounted on the brackets and forwardly extended therefrom on opposite sides of the tractor over the rear axle housing for pivotal movement between an upwardly retracted position and a downwardly pivoted position, means releasably interconnecting the frame and the arms in downwardly pivoted position, means mounted on the arms supporting the rearward end of the frame on the rear axle housing when the arms are in downwardly pivoted position, an hydraulic fork lift mounted on the rearward end of the frame, an hydraulic ram pivotally interconnecting the fork lift and the arms, means releasably interconnecting the rearward end portion of the frame and the power lift of the tractor, the frame and elements borne thereby having a combined center of gravity rearwardly of the connection of said last named means to the frame whereby actuation of the lift means raises the forward end portion of the frame to bring the shaft into rearward alignment with the hooks and continued actuation raises the rearward end portion of the frame and slides the shaft forwardly into the hooks, and a substantially fluid tight hydraulic system borne by the frame including a pump having releasable driven connection to the power take-off shaft, control valves borne by the arms and having connection to the hydraulic fork lift and the ram.

8. In combination with a vehicle having forward and rearward ends, a rear axle housing, hooks downwardly extended from the vehicle, and drive mechanism including a forwardly extended rotatable drive shaft; a mounting device for supporting a work tool on the vehicle having hydraulically actuated work means comprising an elongated frame having a transverse rod releasably received in the hooks for supporting the frame in substantially horizontal position beneath the vehicle, an end forwardly extended from the vehicle, and an end rearwardly extended from the vehicle beneath the rear axle housing; an hydraulic pump mounted on the forwardly extended end of the frame having a driven shaft; means releasably coupling the drive shaft of the vehicle to the driven shaft of the pump for energizing the pump; end members connected to the frame and upwardly extended rearwardly of the rear axle housing; elongated support means pivotally connected to the end members for vertical pivotal movement between a downwardly extended position and an upwardly retracted position; vehicle operating controls mounted on the support means releasably connected to the drive mechanism of the vehicle in the lower position of the support means and releasable to permit elevation of the support means; an hydraulic valve mounted on the support means hydraulically connected to the hydraulically actuated means of the work tool; means releasably connecting the support means to the frame in said lower position; means releasably interlocking the support means and the axle housing in said lower position to preclude transverse and rearward longitudinal movement of the frame relative to the vehicle; and fluid conducting means mounted on the frame connecting the pump and the valve in hydraulic series circuit to the hydraulically actuated means of the work tool to enable operation of the work tool by said pump.

9. In combination with a vehicle having forward and rearward end portions, a power lift, and a rear axle housing; a work tool attachment comprising an elongated frame adapted to be received beneath the vehicle in longitudinal alignment therewith, a pair of hooks rigidly mounted beneath the forward end portion of the vehicle in alignment transversely thereof, a shaft mounted transversely on the frame having opposite ends slidably receivable in the hooks, a pair of brackets rigidly mounted on the frame adapted for engagement with the rearward side of the rear axle housing, a pair of arms mounted on the brackets and forwardly extended therefrom on opposite sides of the vehicle over the rear axle housing for pivotal movement between an upwardly retracted position and a downwardly pivoted position, means releasably interconnecting the frame and the arms in downwardly pivoted position, means mounted on the arms supporting the rearward end of the frame on the rear axle housing when the arms are in downwardly pivoted position, a work tool mounted on the rearward end of the frame, and means releasably interconnecting the rearward end portion of the frame and the power lift of the vehicle, the frame and elements borne thereby having a combined center of gravity rearwardly of the connection of said last named means to the frame whereby actuation of the lift means raises the forward end portion of the frame to bring the shaft into alignment with the hooks and continued actuation raises the rearward end portion of the frame and slides the shaft into the hooks.

10. In combination with a vehicle having forward and rearward end portions, and a rear axle housing; a work tool attachment comprising an elongated frame adapted to be received beneath the vehicle in longitudinal alignment therewith for elevational adjustment upwardly against the vehicle, female coupling means rigidly mounted beneath the forward end portion of the vehicle, a male coupling means mounted on the frame and slidably receivable in the female coupling means, a bracket rigidly mounted on the frame adapted for engagement with the rearward side of the rear axle housing, support means mounted on the bracket and forwardly extended therefrom over the rear axle housing for pivotal movement between an upwardly retracted position and a downwardly pivoted position, means releasably interconnecting the frame and the support means in downwardly pivoted position, means mounted on the support means supporting the rearward end of the frame on the rear axle housing when the support means are in downwardly pivoted position, a work tool mounted on the rearward end of the frame, the frame and elements borne thereby having a combined center of gravity rearwardly of the rear axle housing whereby application of lifting force on the rearward end portion of the frame initially raises the forward end portion of the frame to bring the male coupling means into alignment with the female coupling means and continued lifting raises the rearward end portion of the frame and slides the male coupling means into supported engagement with the female coupling means.

11. In combination with a vehicle having forward and rearward end portions and drive means for motivating the vehicle including main vehicle operating means for enabling an operator to control the vehicle while facing forwardly thereof; an auxiliary attachment for mounting a work tool on the rearward end portion of the vehicle and for enabling the vehicle to be operated by an operator facing rearwardly of the vehicle comprising mounting means releasably connected to the vehicle for supporting a work tool outwardly from the rearward end portion of the vehicle, auxiliary vehicle operating means supported on the mounting means, and means releasably interconnecting the drive means and the auxiliary operating means for enabling an operator to control motivation of the vehicle while facing rearwardly to the exclusion of the main vehicle operating means.

12. In combination with a vehicle having forward and rearward end portions and drive means for motivating the vehicle including main vehicle operating means for enabling an operator to control the vehicle while facing forwardly thereof; an auxiliary attachment for mounting a work tool on the rearward end portion of the vehicle and for enabling the vehicle to be operated by an operator facing rearwardly of the vehicle comprising mounting means releasably connected to the vehicle for supporting a work tool outwardly from the rearward end portion of the vehicle, a source of power for operating the work tool supported on the mounting means, a work tool control means connected to the source of power and adapted for connection to the work tool, means releasably interconnecting the vehicle drive means and the source of power for energizing the source of power from the vehicle drive means, auxiliary vehicle operating means supported on the mounting means, and means releasably interconnecting the drive means and the auxiliary operating means for enabling an operator to control motivation of the vehicle while facing rearwardly to the exclusion of the main vehicle operating means.

13. In combination with a vehicle having a substantially horizontal support member, an apparatus for mounting a work tool on the vehicle comprising an elongated frame extended beneath the vehicle and the support member and having a coupling end releasably connected to the vehicle in spaced relation to the support member and a tool mounting end, upwardly extended on the opposite side of the support member from the connection of the coupling end of the frame to the vehicle an elongated arm pivotally connected to the mounting end of the frame for elevational pivotal movement around a substantially horizontal axis between a lower position extended above the support member and an upwardly retracted position, a rigid flap connected to the arm engaging the support member in the lower position of the arm and drawing the frame upwardly against the support member tightly to clamp the support member between the flap and the frame, and means releasably interconnecting the frame and the arm in the lower position of the arm and between the support member and the coupling end of the frame.

14. In combination with a vehicle having opposite ends, a support member mounted in the vehicle at one end thereof, a frame coupling member rigidly mounted in the vehicle at the other end thereof in spaced relation to the support member, an elongated mounting frame extended beneath the support member having a coupling end adjacent to the frame coupling member and a mounting end extended upwardly adjacent to the support member on the opposite side thereof from the coupling member, a vehicle coupling member rigidly mounted in the coupling end of the frame in releasable slidable interfitted connection with the frame coupling member, linkage means pivotally connected to the mounting end of the frame for elevational pivotal movement around a substantially horizontal axis between a lower position extended above and engaging the support member and drawing the frame upwardly against the support member tightly to sandwich the support member between the linkage means and the frame and an upper position retracted from the lower position, the upwardly extended mounting end of the frame also being in engagement with the support member when the coupling members are connected, and means releasably interconnecting the frame and the linkage means in the lower position of the linkage means.

15. In combination with a vehicle having forward and rearward end portions, and a rear axle housing; a work tool attachment comprising an elongated frame received beneath the vehicle in longitudinal alignment therewith for elevational positioning upwardly against the vehicle, coupling means rigidly mounted beneath the forward end portion of the vehicle, coupling means mounted on the frame and releasably connected to the coupling means on the vehicle, the coupling means on the vehicle and the frame being slidably engageable and disengageable incident to movement of the frame longitudinally of the vehicle, the frame including a bracket rigidly upwardly extended on the rearward side of the rear axle housing, support means mounted on the bracket and forwardly extended therefrom over the rear axle housing for pivotal movement between an upwardly retracted position and a downwardly pivoted position, means releasably holding the support means in downwardly pivoted position, means mounted on the support means supporting the rearward end of the frame on the rear axle housing when the support means are in downwardly pivoted position; and a work tool mounted on the rearward end of the frame, the frame and elements borne thereby having a combined center of gravity rearwardly of the rear axle housing whereby application of lifting force on the rearward end portion of the frame initially raises the forward end portion of the frame to bring the coupling means into opposed facing relation and continued lifting raises the rearward end portion of the frame and slides the coupling means into interfitted engagement with each other.

16. The combination of a vehicle having a predetermined coupling end and an oppositely extended mounting end, a support member on said mounting end, an underside, and an elevational power lift mechanism; an apparatus for mounting a work tool on the mounting end of the vehicle including a coupling member mounted on the underside of the vehicle at the coupling end thereof, an elongated frame extended beneath the underside of the vehicle having oppositely extended coupling and mounting ends adjacent to the coupling and mounting ends, respectively, of the vehicle and adapted for elevational movement upwardly into engagement with the underside of the vehicle, and a coupling member mounted on the coupling end of the frame adapted for automatic releasable interfitted connection with the coupling member on the vehicle incident to elevational movement of the frame relative to the vehicle; a work tool supported on the mounting end of the frame so that the frame and the work tool have a combined center of gravity adjacent to the mounting end of the frame; and an elongated flexible lifting member having a lower end pivotally connected to the mounting end of the frame on the same side of the support member as the work tool and an upper end connected to the lift mechanism whereby application of lift force on the mounting end of the frame through the lifting member initially raises the frame coupling end and continued lifting causes the frame coupling member to connect with the vehicle coupling member.

17. The combination of a vehicle having a predetermined coupling end and an oppositely extended mounting end, a support member on said mounting end, an underside, and an elevational power lift mechanism disposed above the support member; an apparatus for mounting a work tool on the mounting end of the vehicle including a coupling member mounted on the underside of the vehicle at the coupling end thereof, an elongated frame extended beneath the underside of the vehicle having oppositely extended coupling and mounting ends adjacent to the coupling and mounting ends, respectively, of the vehicle and adapted for elevational movement upwardly into engagement with the underside of the vehicle, and a coupling member mounted on the coupling end of the frame adapted for automatic releasable interfitted connection with the coupling member on the vehicle incident to elevational and longitudinal movement of the frame relative to the vehicle; a work tool supported on the mounting end of the frame so that the support member is between the tool and the coupling end and so that the frame and the work tool have a combined center of gravity on the opposite side of the support member from said coupling ends; and an elongated flexible member having a lower end connected to the mounting end of the frame on the same side of the support member as the work tool and an upper end upwardly extended over the support member toward the coupling ends and connected to the lift mechanism whereby application of lift force on the mounting end of the frame through the flexible member initially raises the frame coupling end and continued lifting causes the frame to swing longitudinally of the vehicle on the flexible member to bring the coupling members into engagement.

18. In combination with a vehicle having forward and rearward ends, a rear axle housing positioned in said rearward end, an underside, and an elevational lift mechanism disposed above the axle housing, an apparatus for mounting a work tool on the rearward end of the vehicle comprising a horizontal transversely extended rearwardly disposed channel mounted on the underside of the vehicle at the forward end thereof, an elongated frame extended beneath the underside of the vehicle having oppositely extended forward and rearward ends adjacent to the forward and rearward ends, respectively, of the vehicle and adapted for elevational movement upwardly into engagement with the underside of the vehicle, and a transversely extended horizontal rod mounted on the forward end of the frame adapted for automatic releasable interfitted connection with the channel on the vehicle incident to elevational and longitudinal movement of the frame relative to the vehicle; a work tool supported on the end of the frame rearwardly of the axle housing so that the frame and the work tool have a combined center of gravity rearwardly of the axle housing; and an elongated flexible chain having a lower end connected to the rearward end of the frame rearwardly of the axle housing and an upper end forwardly upwardly extended over the axle housing and connected to the lift mechanism whereby application of lift force on the rearward end of the frame through the chain initially raises the forward end of the frame and continued lifting causes the frame to swing longitudinally forwardly of the vehicle on the chain to slide the rod into engagement with the channel.

19. In combination with a vehicle having forward and rearward end portions, and a substantially horizontal load bearing member mounted in the rearward end portion of the vehicle, an attachment releasably connected to the vehicle comprising an elongated frame having a rear mounting end extended under the load bearing member and a forward coupling end extended under the vehicle, means interconnecting the coupling end of the frame and the vehicle, camming means pivotally connected to the mounting end of the frame for elevational pivotal movement around a substantially horizontal axis between frame locking position in camming engagement with the load bearing member for drawing the frame tightly up against the load bearing member, and a frame releasing position disengaged from the load bearing member, a rigid cam positioning member pivotally connected to the mounting end of the frame for forward and rearward tilting movement about a substantially horizontal axis and having a portion upwardly extended from said axis, and means pivotally interconnecting the upwardly extended portion of the positioning member and the camming means and being capable of moving the camming means between said frame locking and releasing positions.

20. In combination with a vehicle, a support member borne by the vehicle, a frame coupling member rigidly mounted in the vehicle in spaced relation to the support member, an elongated mounting frame extended beneath the support member having a coupling end adjacent to the frame coupling member and a mounting end extended upwardly adjacent to the support member on the opposite side thereof from the coupling member, a vehicle coupling member rigidly mounted in the coupling end of the frame in releasable slidable interfitted connection with the frame coupling member, linkage means pivotally connected to the mounting end of the frame for elevational pivotal movement around a substantially horizontal axis between a lower position extended above and engaging the support member with the frame held upwardly against the support member tightly to sandwich the support member between the linkage means and the frame and an upwardly retracted position, the upwardly extended mounting end of the frame also being in engagement with the support member when the coupling members are connected, and means releasably interconnecting the frame and the linkage means in the lower position of the linkage means.

21. In combination with a vehicle having forward and rearward ends and adapted for earth traversing movement in forward and rearward directions, a support member mounted on the rearward end of the vehicle, and a frame coupling member rigidly mounted in the vehicle in forwardly spaced relation to the support member; an apparatus for mounting a work tool in the rearward end of the vehicle and for operation of the tool from a position on the vehicle comprising an elongated mounting frame extended beneath the support member having a coupling end adjacent to the frame coupling member and a mounting end extended upwardly adjacent to the support member on the opposite side thereof from the coupling member, a vehicle coupling member rigidly mounted in the coupling end of the frame and connected to the frame coupling member, linkage means pivotally connected to the mounting end of the frame for elevational pivotal movement around a substantially horizontal axis between a lower position extended above and engaging the support member for sandwiching the support member between the linkage means and the frame, and an upwardly retracted position, the upwardly extended mounting end of the frame being in rearward engagement with the support member when the coupling members are connected, means releasably connecting the frame and the linkage means in the lower position of the linkage means, and an operator's seat rigidly mounted on the linkage means for movement therewith between a lower operating position facing rearwardly of the vehicle in the lower position of the linkage means and an upwardly retracted position in the retracted position of the linkage means; and a work tool mounted on the upwardly extended mounting end of the frame in a position rearwardly of the vehicle.

22. In combination with a support having opposite ends and a substantially horizontal load bearing support member mounted in one end of the support, a frame coupling member rigidly mounted on the vehicle at the other end thereof in spaced relation to the support member, an apparatus for mounting a work tool on the support comprising an elongated frame extended under the support member having an extended coupling end adjacent to the frame coupling member and an oppositely extended tool mounting end extended upwardly adjacent to the support member on the opposite side thereof from the coupling member, a vehicle coupling member mounted in the coupling end of the frame in releasable slidable interfitted engagement with the frame coupling member and mounting the frame for elevational movement of the mounting end of the frame relative to the coupling end, linkage means pivotally connected to the mounting end of the frame for elevational pivotal movement around a substantially horizontal axis between a lower frame locking position extended above and engaging the support member and drawing the frame tightly up against the support member and an upper frame releasing position disengaged from the load bearing member, the upwardly extended tool mounting end of the frame also being in engagement with the support member when the coupling members are connected, and means releasably interconnecting the linkage means and the frame in the frame locking position of the linkage means.

References Cited in the file of this patent

UNITED STATES PATENTS

| | | |
|---|---|---|
| 2,351,104 | Carter | June 13, 1944 |
| 2,381,729 | Dunham et al. | Aug. 7, 1945 |
| 2,394,458 | Lull | Feb. 5, 1946 |
| 2,421,472 | Way | June 3, 1947 |
| 2,485,139 | Coats | Oct. 18, 1949 |
| 2,569,053 | Healy | Sept. 25, 1951 |
| 2,624,478 | Kaplan | Jan. 6, 1953 |
| 2,684,165 | Hill | July 20, 1954 |
| 2,701,072 | Chambers et al. | Feb. 1, 1955 |
| 2,712,391 | Jones | July 5, 1955 |